US007113861B2

(12) United States Patent
Jacobson

(10) Patent No.: US 7,113,861 B2
(45) Date of Patent: Sep. 26, 2006

(54) SYSTEM AND METHOD FOR DIAGNOSING AND CALIBRATING INTERNAL COMBUSTION ENGINES

(75) Inventor: Evan Earl Jacobson, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 11/108,650

(22) Filed: Apr. 19, 2005

(65) Prior Publication Data

US 2005/0187700 A1 Aug. 25, 2005

Related U.S. Application Data

(62) Division of application No. 10/145,103, filed on May 15, 2002, now Pat. No. 6,935,313.

(51) Int. Cl.
*G06F 7/00* (2006.01)
*G06F 1/00* (2006.01)

(52) U.S. Cl. .................. 701/101; 123/434; 123/406.2; 73/116

(58) Field of Classification Search ................ 701/101, 701/103, 110; 123/434, 435, 406.2, 406.26, 123/406.28, 90.1; 73/116
See application file for complete search history.

(56) References Cited

U.S. PATENT DOCUMENTS 3,673,991 A 7/1972 Winn
4,483,294 A 11/1984 Sawamoto
5,093,792 A * 3/1992 Taki et al. .................... 701/99
5,140,850 A 8/1992 Ellmann et al.
5,144,927 A 9/1992 Denz
5,168,854 A 12/1992 Hashimoto et al.
5,544,058 A 8/1996 Demizu et al.
5,687,082 A * 11/1997 Rizzoni ...................... 701/111
5,771,482 A 6/1998 Rizzoni
5,832,404 A 11/1998 Amano
5,875,411 A 2/1999 Volkart et al.
5,878,717 A 3/1999 Zur Loye
5,893,897 A 4/1999 Volkart et al.
5,906,651 A 5/1999 Amano
5,951,617 A 9/1999 Shinohara et al.
5,991,685 A 11/1999 Fukuchi et al.
6,006,154 A 12/1999 Wang
6,023,651 A 2/2000 Nakayama et al.
6,023,964 A 2/2000 Kanbara et al.
6,062,071 A 5/2000 Henn et al.
6,070,567 A 6/2000 Kakizaki et al.
6,079,381 A 6/2000 Morikawa
6,082,187 A 7/2000 Schricker et al.
6,088,647 A * 7/2000 Hemberger et al. ......... 701/104

(Continued)

OTHER PUBLICATIONS

Michael L. Traver et al., *A Neural Network-Based Virtual NOx Sensor for Diesel Engines*, ICE-vol. 34-2, 2000 Spring Technical Conference, ASME (2000).

*Primary Examiner*—John T. Kwon

(57) ABSTRACT

A method, system, and machine-readable storage medium for determining a predetermined operating condition of an internal combustion engine are disclosed. In operation, the method, system and machine-readable storage medium measure a cylinder pressure in at least one combustion chamber at a predetermined point in a combustion cycle. Next, the method, system, and machine-readable storage medium determine at least a first value for an operating parameter of the engine using the measured cylinder pressure, determine a second value for the operating parameter of the engine using data received from at least one engine sensor, and then generate a predetermined signal if a difference between the first value and the second value has a predetermined relationship.

34 Claims, 4 Drawing Sheets

U.S. PATENT DOCUMENTS

| | | | | |
|---|---|---|---|---|
| 6,199,007 | B1 | 3/2001 | Zavarehi et al. | |
| 6,199,426 | B1 | 3/2001 | Shibagaki | |
| 6,213,068 | B1 | 4/2001 | Hassdenteufel | |
| 6,230,095 | B1 | 5/2001 | Wang | |
| 6,234,010 | B1 | 5/2001 | Zavarehi et al. | |
| 6,278,934 | B1 | 8/2001 | Yoon | |
| 6,279,550 | B1 | 8/2001 | Bryant | |
| 6,289,881 | B1 | 9/2001 | Klopp | |
| 6,321,157 | B1 | 11/2001 | Sun et al. | |
| 6,354,268 | B1 | 3/2002 | Beck et al. | |
| 6,357,287 | B1 | 3/2002 | Jin | |
| 6,371,065 | B1 | 4/2002 | Shiraishi et al. | |
| 6,564,623 | B1 * | 5/2003 | Zanetti | 73/117.3 |
| 6,805,099 | B1 * | 10/2004 | Malaczynski et al. | 123/435 |
| 6,876,919 | B1 * | 4/2005 | James et al. | 701/111 |
| 2005/0251322 | A1 * | 11/2005 | Wang et al. | 701/114 |

* cited by examiner

SYSTEM AND METHOD FOR DIAGNOSING AND CALIBRATING INTERNAL COMBUSTION ENGINES

This is a divisional application of application Ser. No. 10/145,103, filed on May 15, 2002, which is incorporated herein by reference now U.S. Pat. No. 6,935,313.

TECHNICAL FIELD

The present invention relates to systems and methods for diagnosing internal combustion engines and, more particularly, to systems and methods for diagnosing and calibrating internal combustion engines using a variety of engine sensors.

BACKGROUND

Recent legislative requirements imposed by the Environmental Protection Agency demand the ability to conduct on-line diagnosis of internal combustion engine performance to ensure compliance with exhaust gas emissions regulations. One such variable that provides an excellent indication of engine performance is the indicated torque generated by each cylinder during the course of the combustion process. There are a number of approaches that may be used to calculate torque, most of which rely on a combination of knowledge from a variety of engine sensors. Also, torque calculations are so complex that several simultaneous measurements are often utilized to ensure accurate and reliable calculations. For example, one approach relies on fuel injector control settings and sensors to indicate the engine's torque level. If one injector fails, the prediction may lose considerable accuracy. The problem may go undetected except perhaps by an operator who recognizes the power loss, unless there is sensor information indicating actual injector performance. Unfortunately, production-intent injector instrumentation is too costly, so an implicit injector performance measure currently is the most viable practical option.

Instead of relying on fuel injector control settings, torque may be calculated based on the output of camshaft and crankshaft speed sensors. Since most modern internal combustion engines include a redundancy of camshaft and crankshaft speed sensors, these torque calculations are typically easier to compute and more reliable. If one sensor fails, its failure is detected and a backup sensor is used.

Recently, engine manufacturers have began to compute torque as a function of cylinder pressure. In this approach, cylinder pressure during combustion is used to compute an instantaneous crankshaft speed which is then converted to torque. The ratio of two cylinder pressure measurements (e.g., one at top dead center (TDC) and one at 60° before TDC) may also be used to compute torque. The measured pressure ratio in one or more cylinders is compared to an optimal pressure ratio for the specific engine operating conditions, and one or more injectors may be trimmed (i.e., the air-fuel ratio is modified) to optimize engine operation. The process of achieving target torque by evaluating pressure ratios has been found to be less complicated than the previously discussed methods because fewer calculations must be performed and failed sensors are more readily identified. Hardware or virtual in-cylinder pressure sensing also provides other measures not available from rotational crankshaft speed. For example, in-cylinder pressure sensing may be used to identify misfiring circuits and calculate combustion noise. Cylinder pressure may also be used to calculate and optimize the mass of air present in a cylinder, and air density in a cylinder.

Given the many methods for calculating torque, and the complexity of the calculations, engine manufacturers are constantly looking for new ways to improve the accuracy of the calculations. Lately, neural networks have been used to further improve accuracy of prior art torque estimating systems. For example, U.S. Pat. No. 6,234,010 to Zavarehi et al. discloses a method for detecting torque of a reciprocating internal combustion engine with the use of a neural network including the steps of: sensing rotational crankshaft speed for a plurality of designated crankshaft rotational positions over a predetermined number of cycles of rotation for each crankshaft position; determining an average crankshaft speed fluctuation for each crankshaft position; determining information representative of crankshaft kinetic energy variations due to each firing event and each compression event in the cylinder; determining information representative of crankshaft torque as a function of the crankshaft kinetic energy variations and the average crankshaft speed; and outputting a representative crankshaft torque signal from a neural network. Since the system disclosed in this reference computes kinetic energy variations due to combustion and compression events, two inputs for each cylinder and an input for average crankshaft speed must be entered into the neural network. This results in a very complicated, processor-intensive network calculation.

What is desirable is an accurate system and method capable of determining torque, cylinder misfires, and other engine operations that rely on a small number of engine operation measurements and do not require an excessive processing capability.

SUMMARY OF THE INVENTION

A method for determining a predetermined operating condition of an internal combustion engine is disclosed. In operation, the method measures a cylinder pressure in at least one combustion chamber at a predetermined point in a combustion cycle. Next, the method determines at least a first value for an operating parameter of the engine using the measured cylinder pressure, determines a second value for the operating parameter of the engine using data received from at least one engine sensor, and then generates a predetermined signal if a difference between the first value and the second value has a predetermined relationship. An apparatus and a machine-readable medium are also provided to implement the disclosed method.

DETAILED DESCRIPTION

Figure 1:
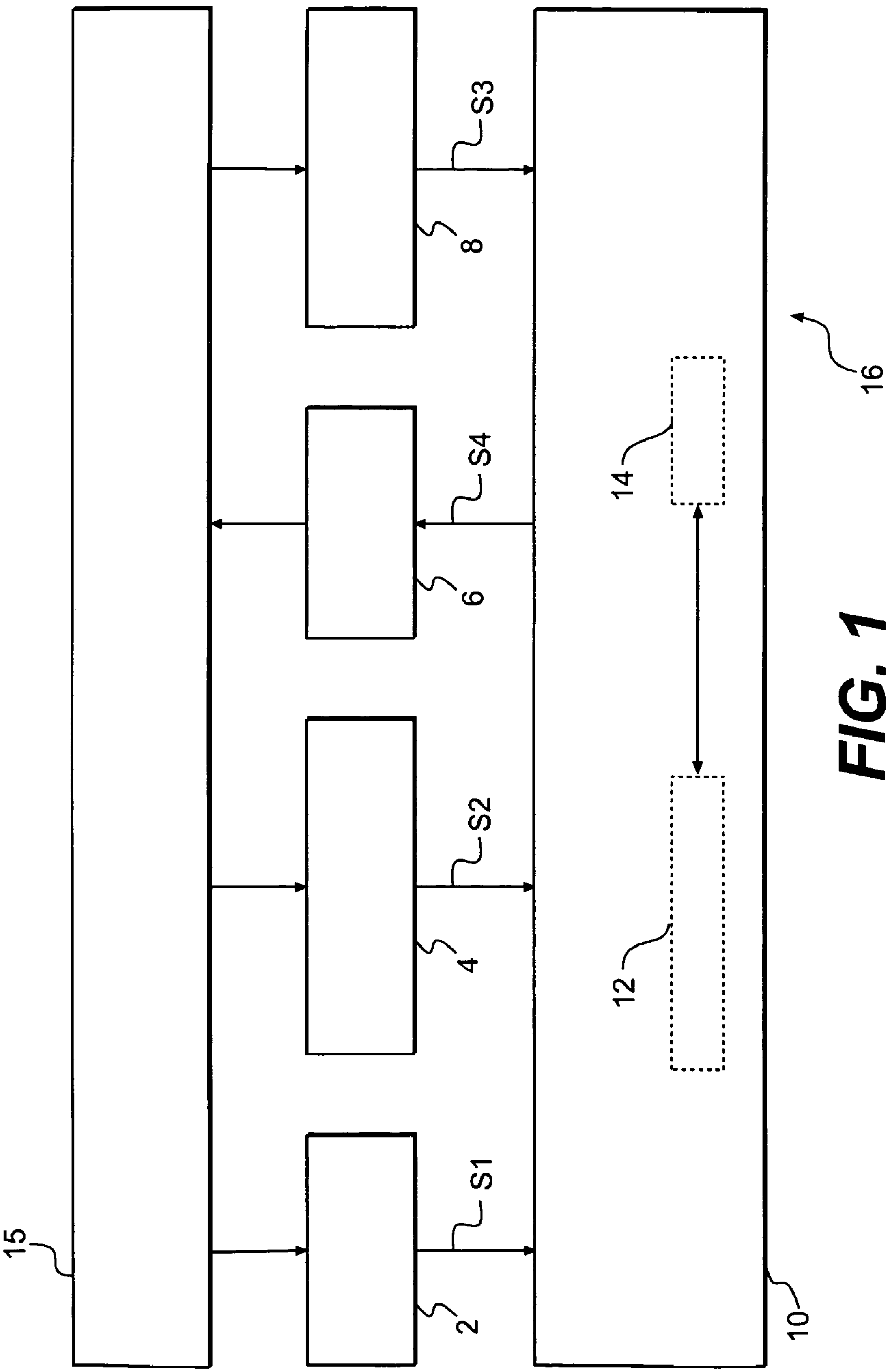
FIG. 1 is a block diagram of an exemplary engine control system that may utilize aspects of embodiments of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

Referring now to FIG. 1, an engine control system 16 for diagnosing and calibrating an internal combustion engine in accordance with one embodiment of the present invention includes at least one crank angle sensor 2, at least one cylinder pressure sensor 4, an engine controller 6, various sensors 8 for measuring the engine operating conditions, and an electronic control module (ECM) 10. In one exemplary embodiment of the present invention, engine control system 16 may include multiple crank angle sensors 2 (one for each cylinder). While the disclosed embodiment will be described as providing a sensor 2 for measuring crank angles, providing results to an ECM, and then commanding a cylinder pressure sensor 4 to measure cylinder pressures at specific crank angles, those skilled in the art of engine control appreciate that there are various other methods of timing the cylinder pressure measurement. ECM 10 includes a microprocessor 12. ECM 10 also includes a memory or data storage unit 14, which may contain a combination of ROM and RAM. ECM 10 receives a crank angle signal ($S_1$) from the crank angle sensor 2, a cylinder pressure signal ($S_2$) from the cylinder pressure sensor 4, and-engine operating condition signals ($S_3$) from the various engine sensors 8. The engine controller 6 receives a control signal ($S_4$) for adjusting engine 15. Even though FIG. 1 depicts a single cylinder pressure sensor 4, engine 15 may include multiple cylinders, each containing a cylinder pressure sensor 4. Also, more than one cylinder pressure sensor may be located in each cylinder.

Figure 2:
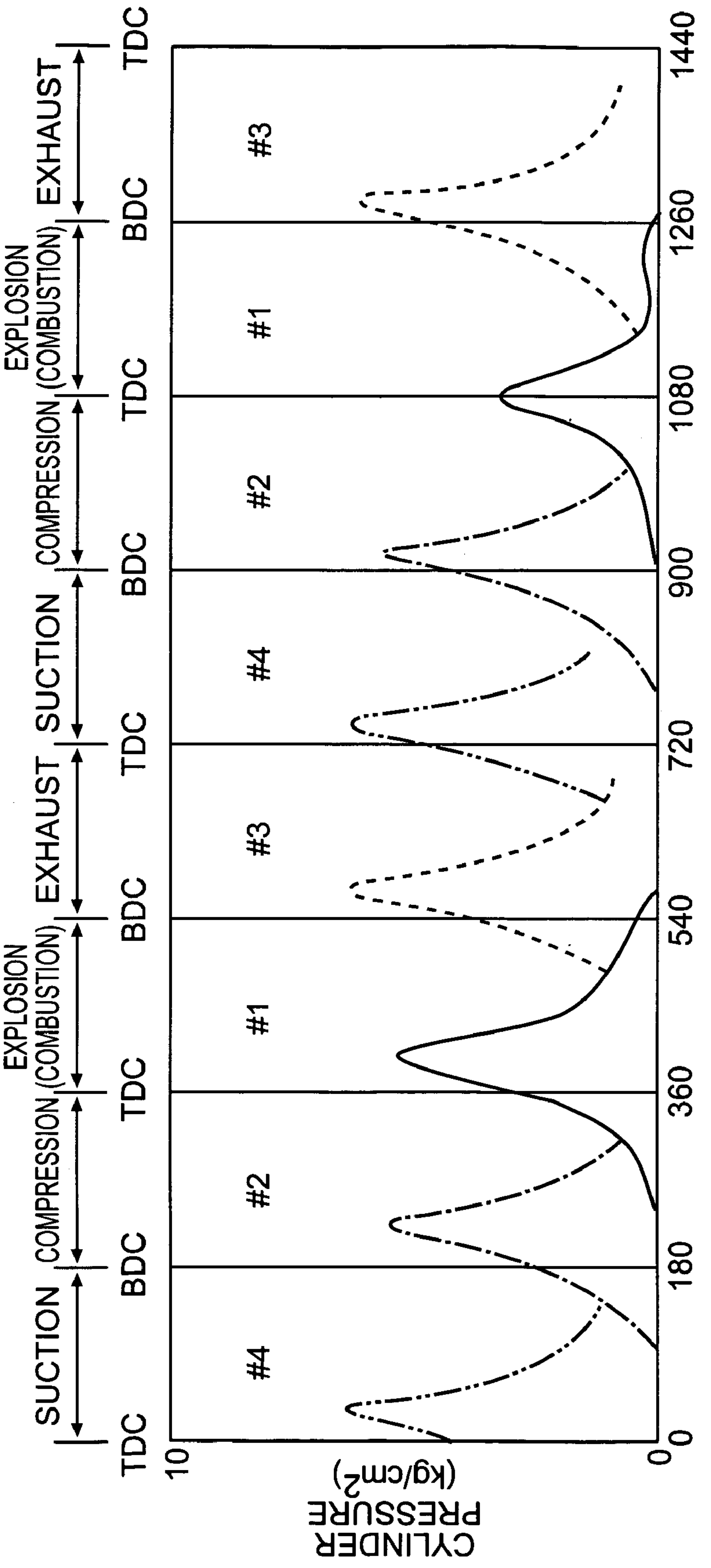
FIG. 2 is a waveform diagram for illustrating changes in pressure within cylinders of a four stroke, four cylinder engine as a function of crank angle.

Referring now to FIG. 2, there is shown a waveform diagram that illustrates changes in the pressure within cylinders 1 to 4 of a conventional four-stroke four-cylinder engine as a function of the crank angle. Above the waveform diagram, there is shown a description of the process performed in cylinder #1. Typically, from 0 to 180°, fuel is injected into the cylinder (intake stroke); from 180 to 360°, the air and fuel in the cylinder is compressed (compression stroke); from 360 to 540°, the air and fuel in the cylinder is ignited (power stroke), and from 540 to 720°, exhaust gases are expelled from the cylinder (exhaust stroke). The various strokes, as described above, may be slightly different for some engines. For example, in diesel engines, fuel is not injected into the engine during the intake stroke. Many diesel engines instead utilize direct injection which allows these engines to perform rate-shaping and other fine injection controls to achieve target heat release profiles that cannot be done without direct injection. In other embodiments, the various strokes may occur at different points, but will be described as indicated above for simplicity. This four stroke process repeats every 720°. Below the cylinder #1 timeline, there is shown a waveform diagram that graphically depicts the compression and power strokes for cylinders 1 through 4. At approximately every 180°, one of the four cylinders is in the power stroke. The Y-axis is labeled "Cylinder Pressure (kg/cm$^2$)" with values ranging from 1 to 10. The X-axis is angular displacement of a crank gear coupled to the crankshaft with values ranging from 0° to 1440°. Therefore it is apparent that FIG. 2 depicts four revolutions of the rotatable crankshaft. It should be noted that each cycle of engine 15 includes two revolutions of the rotatable crankshaft or 720°. As will become apparent in the following detailed description, the illustrated embodiment is based on a four-cylinder engine and will be described with reference to it. However, it is to be understood that the methods set forth are easily adapted for application in any internal combustion engine configuration including, for example, an in-line six cylinder engine and a sixteen (16) cylinder "V" configuration diesel engine.

Figure 3:
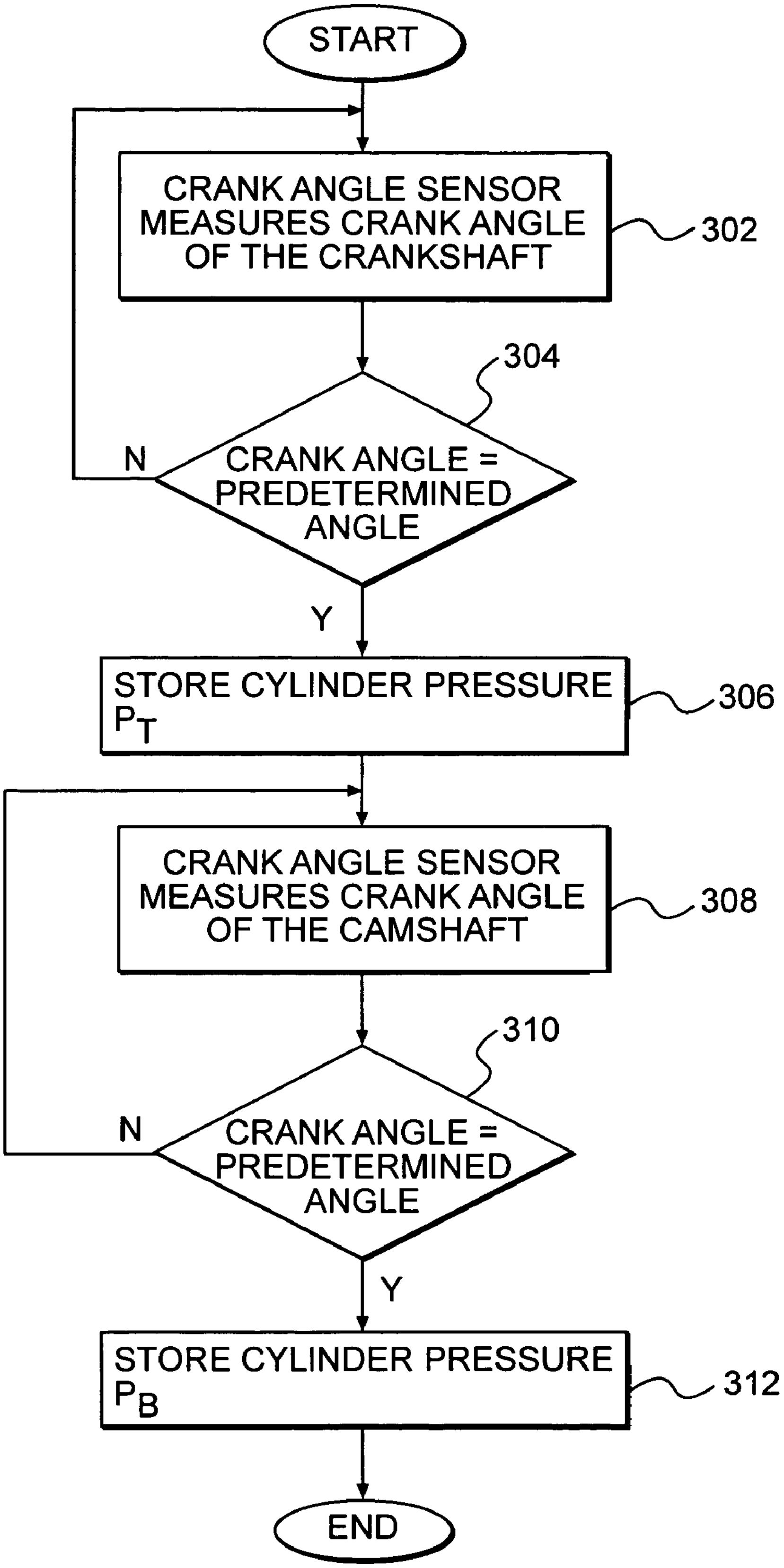
FIG. 3 is a flowchart showing the general operation of an exemplary embodiment of the present invention for calculating cylinder pressure.

The control routine according to one exemplary embodiment of the present invention for measuring torque, misfires, and/or other operations of an internal combustion engine is shown in FIG. 3. This routine may be stored in the memory 14 of ECM 10 and executed by microprocessor 12. In block 302, the crank angle sensor 2 determines (e.g., calculates or measures) the crank angle of the crankshaft and generates an output signal ($S_1$) to ECM 10 indicating the measured crank angle. In block 304, a query is made to determine if the crank angle is at a first predetermined angle, such as 25° after top dead center (ATDC). Once it is determined that the crank angle is 25° ATDC, control is transferred to block 306 to store the cylinder pressure $P_T$ of a first cylinder (e.g., cylinder #4) (indicated by the signal $S_2$) as measured by cylinder pressure sensor 4 in memory 14.

After storing $P_T$, control transfers to block 308, where the crank angle sensor 2 again measures the crank angle of the cylinder crankshaft and generates an output signal $S_1$ to ECM 10 indicating the measured crank angle. In block 310, a query is made to determine if the crank angle is at a second predetermined angle, such as, 25° after bottom dead center (ABDC). Once it is determined that the crank angle is 25° ABDC, control is transferred to block 312 to store the cylinder pressure $P_B$ of the next cylinder (e.g., cylinder #2) (indicated by the signal $S_2$) as measured by cylinder pressure sensor 4 in the memory 14.

Discrete pressure samples taken during the compression stroke may be used to determine the mass of air present in the cylinder. If this mass is determined to be outside of a desired range, intake or exhaust valve actuation or turbocharger operation may be at fault. If necessary, appropriate modification to the engine performance may be made. For example, the intake valve, exhaust valve and/or turbocharger may be calibrated (or trimmed) to yield the target value.

Discrete pressure samples taken during the power stroke may be used to calculate heat release in the cylinder to provide information about the fuel injection event. If the heat release is excessive or too low, for example, the timing and duration of injection pulses may be trimmed to yield a desired value.

In engines in which stroke overlap may be controlled (variable valve timing), discrete pressure samples taken during the overlap period of intake and exhaust valve opening may be used to calculate the amount of residual gas to be used in emissions/performance prediction algorithms. If the sampled pressure amount is outside of a predetermined range, for example, intake or exhaust valve actuation or turbocharger operation may be calibrated or trimmed.

In addition to relying on discrete pressure samples, the above calculations may be based upon sensor inputs. For example, a volumetric efficiency (VE) table may have axes for engine rpm (deduced, for example, from a timing sensor) and air density for fixed valve events. The VE table may have additional axes for flexible valve events. Air density is dependent on intake manifold temperature (sensor) and pressure (sensor) readings. The rule for target air mass may be that it fall within a predetermined range (e.g., +/−5%) of the value deduced via the VE table. Likewise, fuel and coolant temperatures may additionally be required to find the expected ignition delay from a lookup table. Ignition delay may be required to calculate whether or not injection timing and duration match target values in another lookup table (engine rpm, mass air, ambient conditions, and mass fuel are likely axes). In many cases, the sensor input can be from either a virtual or hardware sensor. The target may be two-fold: first trim every cylinder to perform the same, and second, trim the array of cylinders to match the target from the lookup table.

Figure 4:
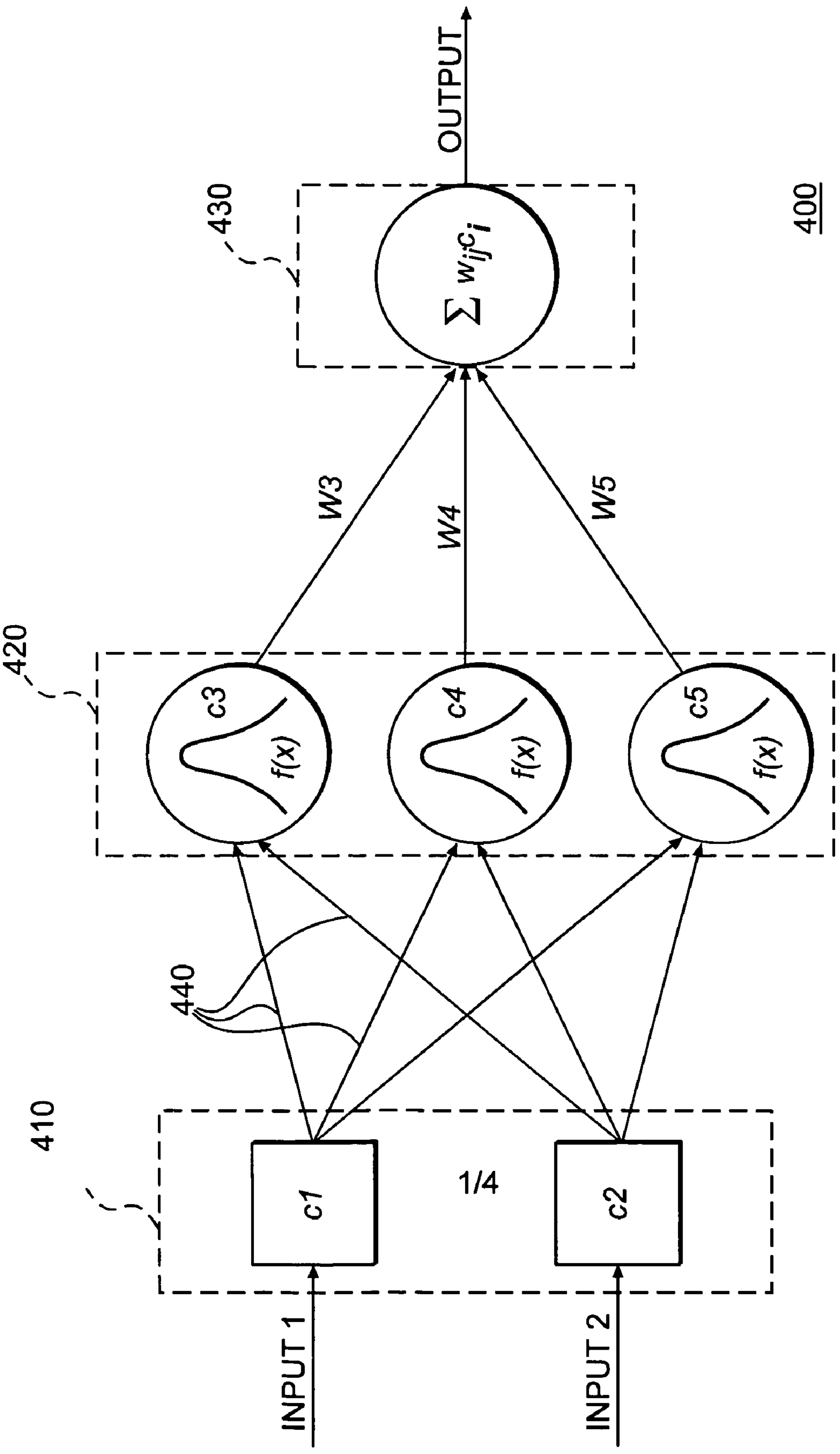
FIG. 4 is a Radial Basis Neural Network in accordance with an exemplary embodiment of the present invention.

When the engine is operating at low speed and light loads, a number of factors combine to produce speed patterns that appear chaotic. Among these factors are gear lash, engine governor settings, and false gear tooth detection. One exemplary embodiment of the present invention uses a radial basis neural network (RBNN) to model known speed patterns at various levels of individual cylinder power and then uses pattern recognition to more accurately characterize engine performance during periods of seemingly random engine behavior. An RBNN is a neural network model based preferably, on radial basis function approximators, the output of which is a real-valued number representing the estimated engine torque at a designated test point. When using an RBNN, cylinder pressure data is compressed into integrated measures, as use of discrete samples would require an excessive number of model inputs. A second exemplary embodiment may use a back propagation or other neural network. Referring to FIG. 4, there is shown a typical radial basis neural network 400 with input layers 410, hidden layers 420, and output layers 430. In turn, each layer has several processing units, called cells ($C_1$–$C_5$), which are joined by connections 440. Each connection 440 has a numerical weight, $W_{ij}$, that specifies the influence of cell $C_i$ on cell $C_j$, and determines the behavior of the network. Each cell $C_i$ computes a numerical output that is indicative of to the torque magnitude for a cylinder of the internal combustion engine 15.

Since the illustrative, but non-limiting, internal combustion engine 12 has four cylinders, and torque magnitude is determined as a function of cylinder pressure variation due to combustion and compression effects and average crankshaft speed, the RBNN for engine torque may at least include 4 (the number of cylinders) times X (pressure variation can be described by X number of variables) inputs, plus inputs for injection timing, IMT, etc. The cells in the input layer normalize the input signals received (preferably, between −1 and +1) and pass the normalized inputs to Gaussian processing cells in the hidden layer. When the weight and threshold factors have been set to correct levels, a complex stimulus pattern at the input layer successively propagates between hidden layers, to result in a simpler output pattern. The network is "taught" by feeding it a succession of input patterns and corresponding expected output patterns. The network "learns" by measuring the difference (at each output unit) between the expected output pattern and the pattern that it just produced. Having done this, the internal weights and thresholds are modified by a learning algorithm to provide an output pattern which more closely approximates the expected output pattern, while minimizing the error over the spectrum of input patterns. Network learning is an iterative process, involving multiple "lessons". Neural networks have the ability to process information in the presence of noisy or incomplete data and still generalize to the correct solution.

As an alternative method, using a fixed-point processor, a linear neural network approach can be used. In the linear neural network approach, the inputs and outputs are in binary −1 (or 0)+1 format, rather than the real-valued input and output data used in the radial basis neural network. With this approach, torque magnitude is determined to be the highest-valued output.

In a second exemplary embodiment of the present invention, RBNN 400 may be used to identify combustion noise (knocks). As is known in the art, the knock signal is typically generated when the cylinder pressure approaches the maximum value. While the frequency range of the knock signal varies with the inner diameter of the cylinder, it generally exceeds 5 kHz. Therefore, by passing the cylinder pressure waveform generated by RBNN 400 through a high-pass filter whose cutoff frequency is around 5 kHz, it becomes possible to extract only the knock signal. Since combustion knock also tends to indicate intense combustion temperatures that promote production of various Nitrogen Oxides ($NO_x$), RBNN 400 may also be used to control $NO_x$ production.

INDUSTRIAL APPLICABILITY

While engine 15 is designed to achieve substantially the same combustion event in each cylinder for a given set of engine conditions, in actuality, the combustion event within each cylinder will vary from cylinder to cylinder due to manufacturing tolerances and deterioration-induced structural and functional differences between components associated with the cylinders. Therefore, by monitoring the variability in the pressure ratio in the individual cylinders, the engine control system 16 can separately adjust the air-fuel ratio within the different cylinders to balance the performance of the individual cylinders. Similarly, by comparing the pressure of the individual cylinders and their variations to predetermined target pressures, the engine control system 16 of the present invention can accurately compute torque and other measurements, while also detecting poorly functioning or deteriorating components.

The present invention may be advantageously applicable in performing diagnostics and injector trim using in-cylinder pressure sensing. With the implementation of complex injection and air systems on internal combustion engines comes the difficulty of calibration and diagnostics. Some calibration can take place at the component level at each element's time of manufacture (component calibration). Other calibrations need to take place once the components have been assembled into the system (system calibration). System calibration can sometimes eliminate the need for component calibrations, thus saving the time/expense of redundant operations. This method includes the advantage of providing the capability to perform on-line diagnostics and system calibration using in-cylinder pressure sensing.

Another aspect of the described system may be the advantage of eliminating external measuring devices such as dynamometers. The representative crankshaft torque can be responsively produced and communicated to a user, stored and/or transmitted to a base station for subsequent action. This present invention can be utilized on virtually any type and size of internal combustion engine.

Yet another aspect of the described invention may be the benefit provided through the use of a neural network to model torque, combustion knocks and misfires. The use of neural networks permits the present invention to provide accurate and prompt feedback to a control module and/or system users.

Benefits of the described system are warranty reduction and emissions compliance. More accurate monitoring of the engine system will allow narrower development margins for emissions, directly resulting in better fuel economy for the end user.

While the invention has been illustrated and described in detail in the drawings and foregoing description, the same is to be considered as illustrative and not restrictive in character. It should be understood that only exemplary embodiments have been shown and described and that all changes and modifications that come within the spirit of the invention are desired to be protected.

What is claimed is:

1. A method for determining a predetermined operating condition of an internal combustion engine, the method comprising:

measuring a cylinder pressure in at least one combustion chamber, for at least one cylinder, at a predetermined point in a combustion cycle, the predetermined point in the combustion cycle is during at least one of an exhaust stroke and an intake stroke of the at least one cylinder;

inputting the measured cylinder pressure for the at least one cylinder into a neural network;

determining from the neural network output, whether a predetermined condition exists in at least one cylinder; and adjusting a component of the at least one cylinder, if an abnormal condition has been detected.

2. The method of claim 1, wherein the adjusted component is valve timing.

3. The method of claim 1, wherein the adjusted component comprises an air-fuel ratio.

4. The method of claim 1, wherein the neural network comprises a back propagation neural network.

5. The method of claim 1, wherein the abnormal condition comprises a cylinder misfire.

6. The method of claim 5, wherein the determining step further comprises:

evaluating at least two pressure outputs from a cylinder;

comparing the output to a previous output pressure from the cylinder; and determining that the cylinder has misfired, if:

the difference between the current output value and a previous output value has a predetermined relationship; and the engine has remained in a substantially constant operating condition.

7. The method of claim 6, wherein the determining step includes the step of determining that the cylinder has misfired, if the difference between the current output value and a previous output value exceeds a predetermined amount.

8. The method of claim 1, wherein the abnormal condition comprises a combustion knock.

9. The method of claim 8, wherein the determining step further includes:

evaluating a peak rate of pressure rise from a cylinder; and determining that a combustion knock has occurred, if the peak rate of pressure rise exceeds a predetermined value.

10. The method of claim 9, wherein the determining step further comprises determining that a combustion knock has occurred, if the difference between a current pressure output value and a previous pressure output value exceeds a predetermined amount.

11. A machine-readable storage medium having stored thereon machine executable instructions, the execution of said instructions adapted to implement a method for determining a predetermined operating condition of an internal combustion engine, the method comprising:

measuring a cylinder pressure in at least one combustion chamber, for at least one cylinder, at a predetermined point in a combustion cycle;

inputting the measured cylinder pressure for the at least one cylinder into a neural network; and determining an emissions characteristic from a neural network output.

12. The machine-readable storage medium of claim 11, wherein the predetermined point in a combustion cycle is during at least one stroke of a combustion cycle.

13. The machine-readable storage medium of claim 11, wherein the method for determining the predetermined operating condition further includes:

determining from the neural network output whether a predetermined condition exists in the at least one cylinder;

adjusting a component of the at least one cylinder if an abnormal condition has been detected, and the adjusted component is valve timing.

14. The machine-readable storage medium of claim 11, wherein the method for determining the predetermined operating condition further includes:

determining from the neural network output whether a predetermined condition exists in the at least one cylinder;

adjusting a component of the at least one cylinder if an abnormal condition has been detected, and the adjusted component comprises an air-fuel ratio.

15. The machine-readable storage medium of claim 11, wherein the neural network comprises a back propagation neural network.

16. The machine-readable storage medium of claim 11, wherein the method for determining the predetermined operating condition further includes:

determining from the neural network output whether a predetermined condition exists in the at least one cylinder;

adjusting a component of the at least one cylinder if an abnormal condition has been detected, and the abnormal condition comprises a cylinder misfire.

17. The machine-readable storage medium of claim 16, wherein the determining step further includes;

evaluating a pressure output from a cylinder;

comparing the output to a previous output pressure from the cylinder; and determining that the cylinder has misfired, if:

the difference between the current output value and a previous output value has a predetermined relationship; and the engine has remained in a substantially constant operating condition.

18. The machine-readable storage medium of claim 11, wherein the method for determining the predetermined operating condition further includes:

determining from the neural network output whether a predetermined condition exists in the at least one cylinder;

adjusting a component of the at least one cylinder if an abnormal condition has been detected, and the abnormal condition comprises a combustion knock.

19. The machine-readable storage medium of claim 18, wherein the determining step further includes:

evaluating a peak rate of pressure rise from a cylinder; and determining that a combustion knock has occurred, if the peak rate of pressure rise exceeds a predetermined amount.

20. An apparatus for determining a predetermined operating condition of an internal combustion engine, the apparatus comprising:

a module configured to measure a cylinder pressure in at least one combustion chamber, for at least one cylinder, at a predetermined point in a combustion cycle;

a module configured to determine a heat release profile of the at least one cylinder based on the measured cylinder pressure for the at least one cylinder;

a module configured to input the measured cylinder pressure for the at least one cylinder into a neural network;

a module configured to determine from the neural network output, whether a predetermined condition exists in at least one cylinder; and a module configured to adjust a component of the at least one cylinder, if an abnormal condition has been detected.

21. The apparatus of claim 20, wherein the predetermined point in a combustion cycle is during at least one stroke of a combustion cycle.

22. The apparatus of claim 20, wherein the adjusted component is valve timing.

23. The apparatus of claim 20, wherein the adjusted component comprises air-fuel ratio.

24. The apparatus of claim 20, wherein the neural network comprises a back propagation neural network.

25. The apparatus of claim 20, wherein the abnormal condition comprises a cylinder misfire.

26. The apparatus of claim 25, wherein the module configured to determine further includes;

a module configured to evaluate a pressure output from a cylinder;

a module configured to compare the output to a previous output pressure from the cylinder; and a module configured to determine that the cylinder has misfired, if:

the difference between the current output value and a previous output value has a predetermined relationship; and the engine has remained in a substantially constant operating condition.

27. The apparatus of claim 20, wherein the abnormal condition comprises a combustion knock.

28. The apparatus of claim 27, wherein the module configured to determine further includes:

a module configured to evaluate a pressure output from a cylinder; and a module configured to determine that a combustion knock has occurred, if a peak rate of pressure rise exceeds a predetermined amount.

29. The apparatus of claim 28, wherein the plurality of modules comprise functionally related computer program code and data.

30. The method of claim 1, wherein the predetermined point occurs when an intake valve and an exhaust valve are open.

31. The method of claim 1, wherein the adjusting of the component of the at least one cylinder includes adjusting at least one of an intake valve and an exhaust valve actuation characteristic.

32. The method of claim 1, wherein the adjusting of the component of the at least one cylinder includes adjusting a turbocharger operation.

33. The machine-readable storage medium of claim 11, wherein the method for determining the predetermined operating condition further includes calculating an amount of residual gas of the at least one cylinder based on the measured cylinder pressure, and the predicting of the emissions characteristic is based on the calculated amount of residual gas.

34. The apparatus of claim 20, further including a module configured to adjust at least one of a timing and duration of an injection phase based on the heat release profile.

* * * * *